United States Patent
Takeda (10) Patent No.: US 8,818,645 B2
(45) Date of Patent: Aug. 26, 2014

(54) VEHICLE CONTROL APPARATUS

(75) Inventor: Toshihiko Takeda, Chiryu (JP)

(73) Assignee: Denso Corporation, Kariya (JP)

( * ) Notice: Subject to any disclaimer, the term of this patent is extended or adjusted under 35 U.S.C. 154(b) by 19 days.

(21) Appl. No.: 13/444,879

(22) Filed: Apr. 12, 2012

(65) Prior Publication Data

US 2012/0265409 A1    Oct. 18, 2012

(30) Foreign Application Priority Data

Apr. 14, 2011   (JP) .................................. 2011-90310

(51) Int. Cl.
*G06F 17/00*    (2006.01)
*B60W 50/06*    (2006.01)
*B60W 50/02*    (2012.01)

(52) U.S. Cl.
CPC ........... *B60W 50/06* (2013.01); *B60W 50/0225* (2013.01)
USPC ........................................................ 701/48

(58) Field of Classification Search
CPC ...... B60W 50/06; B60W 10/02; B60R 16/03; B60L 7/16; B60L 15/2009; B60K 6/365; B60K 23/04; B60H 1/005; F02D 13/0226; F02D 41/0082
USPC .............. 701/22, 36, 48, 70, 68; 303/11, 152; 180/65.256, 244; 475/5; 123/179.18; 60/285; 73/114.49
See application file for complete search history.

(56) References Cited

U.S. PATENT DOCUMENTS

| | | | | |
|---|---|---|---|---|
| 5,839,800 | A * | 11/1998 | Koga et al. | 303/152 |
| 6,327,850 | B1 * | 12/2001 | Yasui et al. | 60/285 |
| 2004/0117099 | A1 * | 6/2004 | Inagaki et al. | 701/70 |
| 2006/0102127 | A1 * | 5/2006 | Izumi et al. | 123/179.18 |
| 2006/0259219 | A1 * | 11/2006 | Wakiyama et al. | 701/36 |
| 2007/0184928 | A1 * | 8/2007 | Yasui et al. | 475/5 |
| 2009/0096280 | A1 * | 4/2009 | Yamanao et al. | 303/11 |
| 2010/0006358 | A1 * | 1/2010 | Ishikawa | 180/65.265 |
| 2010/0191431 | A1 * | 7/2010 | Petzold et al. | 701/68 |
| 2010/0252348 | A1 * | 10/2010 | Ueda et al. | 180/244 |

(Continued)

FOREIGN PATENT DOCUMENTS

| | | |
|---|---|---|
| JP | 2002-180863 | 6/2002 |
| JP | 2002-317686 | 10/2002 |
| JP | 2004-251856 | 9/2004 |
| JP | 2004-293556 | 10/2004 |

(Continued)

OTHER PUBLICATIONS

Office Action (2 pages) dated Jan. 22, 2013 issued in corresponding Japanese Application No. 2011-90310 and English translation (2 pages).

*Primary Examiner* — Tuan C. To
*Assistant Examiner* — Yuri Kan
(74) *Attorney, Agent, or Firm* — Nixon & Vanderhye P.C.

(57) ABSTRACT

A vehicle control apparatus for a vehicle causes several control target instruments to operate in cooperation, thereby controlling a behavior of the vehicle so as to approach a target behavior of the vehicle. In this case, target behaviors of several control target instruments are estimated. When a separation arises in a certain control target instrument between an actual behavior and the target behavior, operations of other control target instruments are changed according to the magnitude of the separation in the certain control target instrument. Thereby, even if an anomaly arises in one of the control target instruments, the behavior of the vehicle can be brought close to the target behavior.

10 Claims, 4 Drawing Sheets

(56) References Cited

U.S. PATENT DOCUMENTS

2010/0268408 A1* 10/2010 Yuki .............................. 701/22
2010/0274451 A1* 10/2010 Hiruma ......................... 701/48
2012/0265409 A1* 10/2012 Takeda ......................... 701/48

FOREIGN PATENT DOCUMENTS

| | | |
|---|---|---|
| JP | 2009-214752 | 9/2009 |
| JP | 2009-243397 | 10/2009 |
| JP | 2010-158944 | 7/2010 |

* cited by examiner

VEHICLE CONTROL APPARATUS

CROSS REFERENCE TO RELATED APPLICATION

This application is based on Japanese Patent Application No. 2011-90310 filed on Apr. 14, 2011, the disclosure of which is incorporated herein by reference.

TECHNICAL FIELD

The present disclosure relates to a vehicle control apparatus which controls behavior of a vehicle.

BACKGROUND

[Patent document 1] JP-2009-243397 A

For example, Patent document 1 recites a power train control method which enables convergence to a target output without varying an actual output. This power train control method simulates, based on a target acceleration, a predicted acceleration on a vehicle power train model that includes a vehicle model having an engine model and a transfer model relative to a drive. The simulated predicted acceleration is fed back to a control of the target acceleration. In particular, an operation quantity of an engine (also referred to as a virtual control parameter) is adjusted based on a difference between the predicted acceleration and the target acceleration and outputted to the engine model. The virtual control parameter includes a throttle opening, an ignition time, a valve phase angle, and an injection quantity. The engine model outputs a predicted value (target torque) of a torque outputted from the engine, based on the received operation quantity. The vehicle model receives the target torque and outputs a predicted value of the acceleration generated on the vehicle (predicted acceleration).

Thus, the power train control method of Patent document 1 does not execute a feedback control using an actual acceleration, but executes a feedback control using a predicted acceleration. This eliminates an influence of a disturbance factor and stabilizes a target acceleration and a target torque.

As explained in the above, the technology of Patent document 1 intends to adjust the virtual operation quantity of the engine so as to make the predicted acceleration converge to the target acceleration.

A behavior of the vehicle such as an acceleration may not be determined only depending on an operating state of the engine. For example, suppose a hybrid system equipped with an engine and an electric motor as a driving source. In this system, the behavior of the vehicle is determined by a comprehensive operation of several subsystems such as the engine and the motor. In such a case, if not taking into the consideration not only the operation of the engine but also the operations of other subsystems which have an influence on the behavior of the vehicle, the behavior of the vehicle cannot approach the target behavior.

To that end, the following may be considered. That is, a target value relative to a behavior of the vehicle is calculated. According to the target value, several subsystems are operated in cooperation, thereby achieving a target behavior. In this case, a target behavior may be estimated. This target behavior should be demonstrated in the vehicle when several subsystems are operated according to the target value. When the actual behavior of the vehicle shifts from the target behavior, the target value may be amended. Therefore, the behavior of the vehicle can approach the target behavior.

However, there is a case where an anomaly arises in a subsystem or a transitional behavior arises in a subsystem. In such a case, it may become difficult to bring the actual behavior close to the target behavior only by correcting the target value relative to the vehicle behavior.

SUMMARY

It is an object of the present disclosure to provide a vehicle control apparatus which brings an actual behavior of the vehicle close to a target behavior even if the behavior deviates from the target behavior because of an anomaly in a subsystem or a transitional behavior of a subsystem.

To achieve the above object according to an aspect of the disclosure, a vehicle control apparatus is provided as follows. A target value calculation section is included to calculate a target value relative to a vehicle behavior of the vehicle. A control section is included to cause a plurality of instruments to operate in cooperation according to the target value relative to the vehicle behavior to control the vehicle behavior of the vehicle. A first physical quantity detection section is included to detect a first physical quantity relative to an actual vehicle behavior of the vehicle. A first determination section is included to determine whether a separation arises between a target vehicle behavior and an actual vehicle behavior of the vehicle based on the target value relative to the vehicle behavior calculated by the target value calculation section and the first physical quantity relative to the actual vehicle behavior detected by the first physical quantity detection section. An instrument behavior estimation section is included to estimate an estimated instrument behavior of a behavior estimated instrument that includes at least one instrument among the plurality of instruments, the estimated instrument behavior being demonstrated when the behavior estimated instrument is caused by the control section to operate in cooperation according to the target value. A second physical quantity detection section is included to detect a second physical quantity relative to an actual instrument behavior demonstrated by the behavior estimated instrument whose instrument behavior is estimated by the instrument behavior estimation section. A second determination section is included to determine with respect to the behavior estimated instrument whether a separation is exhibited between an estimated instrument behavior and an actual instrument behavior based on the estimated instrument behavior estimated by the instrument behavior estimation section and the second physical quantity relative to the actual instrument behavior detected by the second physical quantity detection section. The control section is further configured to bring the actual vehicle behavior close to the target vehicle behavior by changing operations of the plurality of instruments according to a magnitude of the separation exhibited in the behavior estimated instrument when (i) the first determination section determines that a separation is exhibited in the vehicle between the target vehicle behavior and the actual vehicle behavior, and, simultaneously, (ii) the second determination section determines that the separation is exhibited in the behavior estimated instrument between the estimated instrument behavior and the actual instrument behavior.

For example, suppose a case that one of several instruments or subsystems is an engine in a hybrid vehicle while the second physical quantity detection section is a rotation number detection section which detects an engine speed value or rotation number of the engine. In this case, when the detected rotation number of the engine does not reach the planned or targeted rotation number, the output of an engine auxiliary instrument such as an electric generator is adjusted so as to prompt the increase in the engine rotation number, thereby reducing the engine load. Thereby, the engine behavior returns to the target behavior easily. As a result, it is possible to maintain the vehicle behavior at the target behavior of the vehicle.

In addition, suppose the case when the engine cannot output a desired value transitionally in a hybrid vehicle. In this case, according to the configuration of subsystems of each hybrid vehicle, a target behavior of an electric motor or transmission may be amended so as to enable the vehicle behavior to become the target behavior.

Thus, the above configuration in the vehicle control apparatus controls the behavior of the vehicle by operating several instruments or subsystems in cooperation. When a separation or deviation arises in the instrument behavior of at least one behavior estimated instrument to thereby disable the execution of the target operation, the contents of the operations of the several instruments are changed according to the magnitude of the separation of the instrument behavior of the behavior estimated instrument that exhibits the separation. Even if an anomaly or a transitional behavior arises in the behavior estimated instrument, the behavior of the vehicle can be brought close to the target behavior.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

A vehicle control apparatus according to an embodiment of the present disclosure is explained with reference to drawings. The following will explain an example of the present embodiment where a vehicle control apparatus is applied to a hybrid vehicle having an engine and an electric motor as a travel drive source. The vehicle control apparatus may be applied to a vehicle having only an engine, or a vehicle having only an electric motor.

Figure 1:
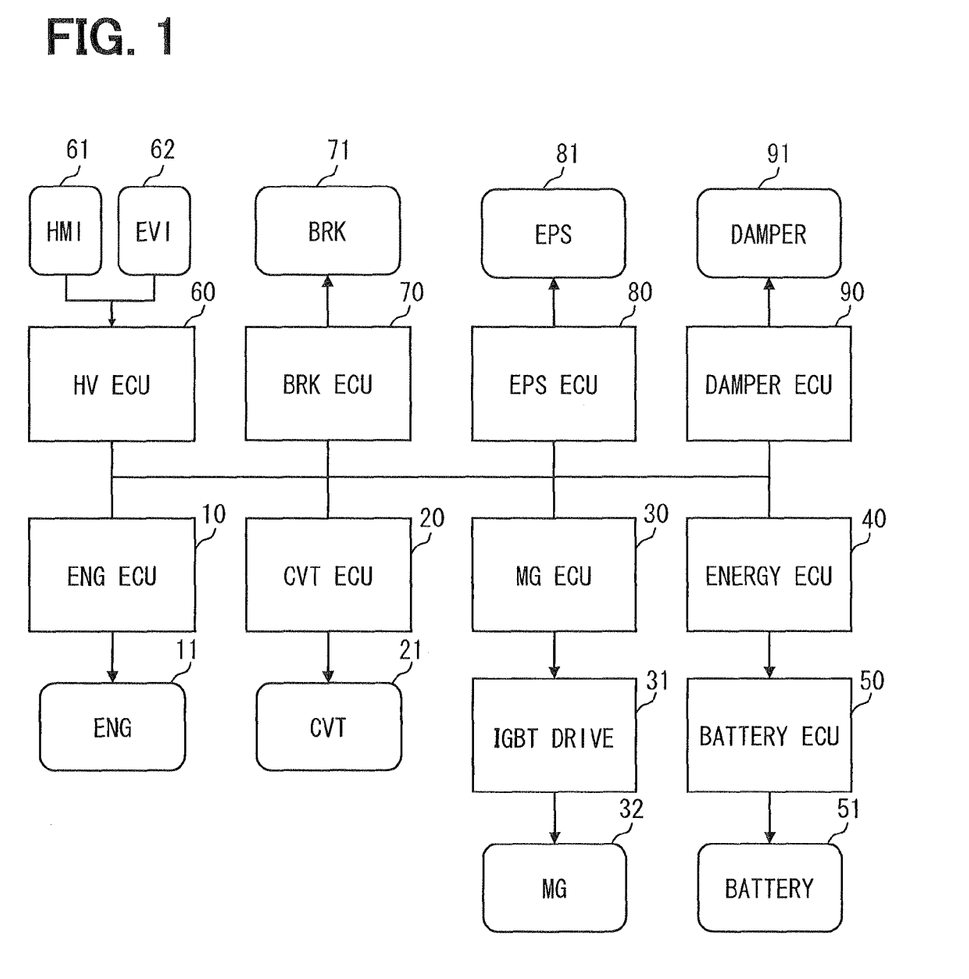
FIG. 1 is a block diagram indicating a configuration for controlling a travel of a hybrid vehicle to which a vehicle control apparatus according to an embodiment of the present disclosure is applied.

FIG. 1 is a block diagram indicating a configuration for controlling travel of a hybrid vehicle serving as a subject vehicle. As indicated in FIG. 1, the hybrid vehicle or the subject vehicle has an engine 11 and a motor generator (MG) 32 functioning as an electric motor, as a travel driving source or driving power source. The motor generator 32 is arranged on an output axis of the engine 11. Furthermore, a continuously variable transmission (CVT) 21 is connected with the output axis of the engine 11.

The motor generator 32 operates on feeding power received from a battery 51 mounted in the vehicle, and assists a driving power of the engine 11. In addition, when the vehicle slows down, the motor generator 32 generates electricity by rotational driving from the wheels of the vehicle, and charges the battery 51 (energy regeneration). In such a configuration, if a clutch is provided in between the engine 11 and the motor generator 32 to separate the motor generator 32 from the engine 11, the vehicle can be driven only by the driving power of the motor generator 32.

The CVT 21 is a typical continuously variable transmission or a gearless drive mechanism that has a forward-backward switchover mechanism and a general configuration where an input axis connected with the output axis of the engine 11, and an output axis connected with a drive shaft via a main clutch for movement start-up are connected with a metal belt. This CVT 21 uses, for example, oil pressure to change a pulley width of a pulley arranged in each of the input axis and the output axis to change a winding radius of the metal belt, thereby enabling the change of the transmission gear ratio stepless. Without need to be limited thereto, the CVT 21 may be replaced with an automatic transmission which has several transmission gear ratios set previously.

The above explains as a hybrid system an example of a so-called parallel method. Without need to be limited thereto, a split method or a series parallel method may be used as a hybrid system.

A brake instrument 71 uses, for instance, a hydraulic pump or an electric motor and enables a generation of a braking force irrespective of manipulation applied to a brake pedal by the driver. An electric power steering instrument (EPS) 81 assists a steering force using an electric motor when the driver manipulates a steering wheel. In addition, a damper 91 is arranged between each wheel of the vehicle and the body of the vehicle, respectively, and enables the change in the damping force using a damper ECU (Electronic Control Unit) 90. Hereinafter, an electronic control unit is referred to as an "ECU", similarly.

A human machine interface (HMI) 61 signifies a manipulation section manipulated by the driver for driving of the hybrid vehicle and corresponds to an accelerator pedal, a brake pedal, a steering wheel, or a shift lever, for instance. An operation quantity in each manipulation section is detected by a sensor and inputted into a hybrid vehicle (HV) ECU 60. A detection signal from such a sensor may be inputted into another ECU. Further, the sensor may be connected via a communication line with each ECU.

An environment vehicle interface (EVI) 62 is to acquire information on external environment that surrounds the hybrid vehicle; it includes a radar instrument which detects an obstacle or traveling-ahead vehicle that travels ahead of the subject vehicle, and a camera which acquires an image surrounding the subject vehicle, for example. Acquiring the information on the external environment enables adjustment of a velocity of the subject vehicle so as to follow a traveling-ahead vehicle (i.e., adaptive cruise control), or the recognition of a while line from a captured image to thereby adjust an assisting force by the electric power steering instrument (EPS) 81 so as to cause the subject vehicle to be not deviated from a travel lane defined by the white line (i.e., rain keeping control), for instance.

In the present embodiment, the hybrid vehicle has a control system (also referred to as a control group) that includes the following: an engine ECU 10; a CVT (continuous variable transmission) ECU 20; a MG (motor generator) ECU 30; an energy management ECU 40; a battery ECU 50; a HV (hybrid vehicle) ECU 60; a brake ECU 70; an EPS (electric power steering) ECU 80; and a damper ECU 90. These ECUs communicate or electrically connect with each other via a communication link. The communication link includes a well-known in-vehicle LAN such as CAN, or LIN.

Figure 2:
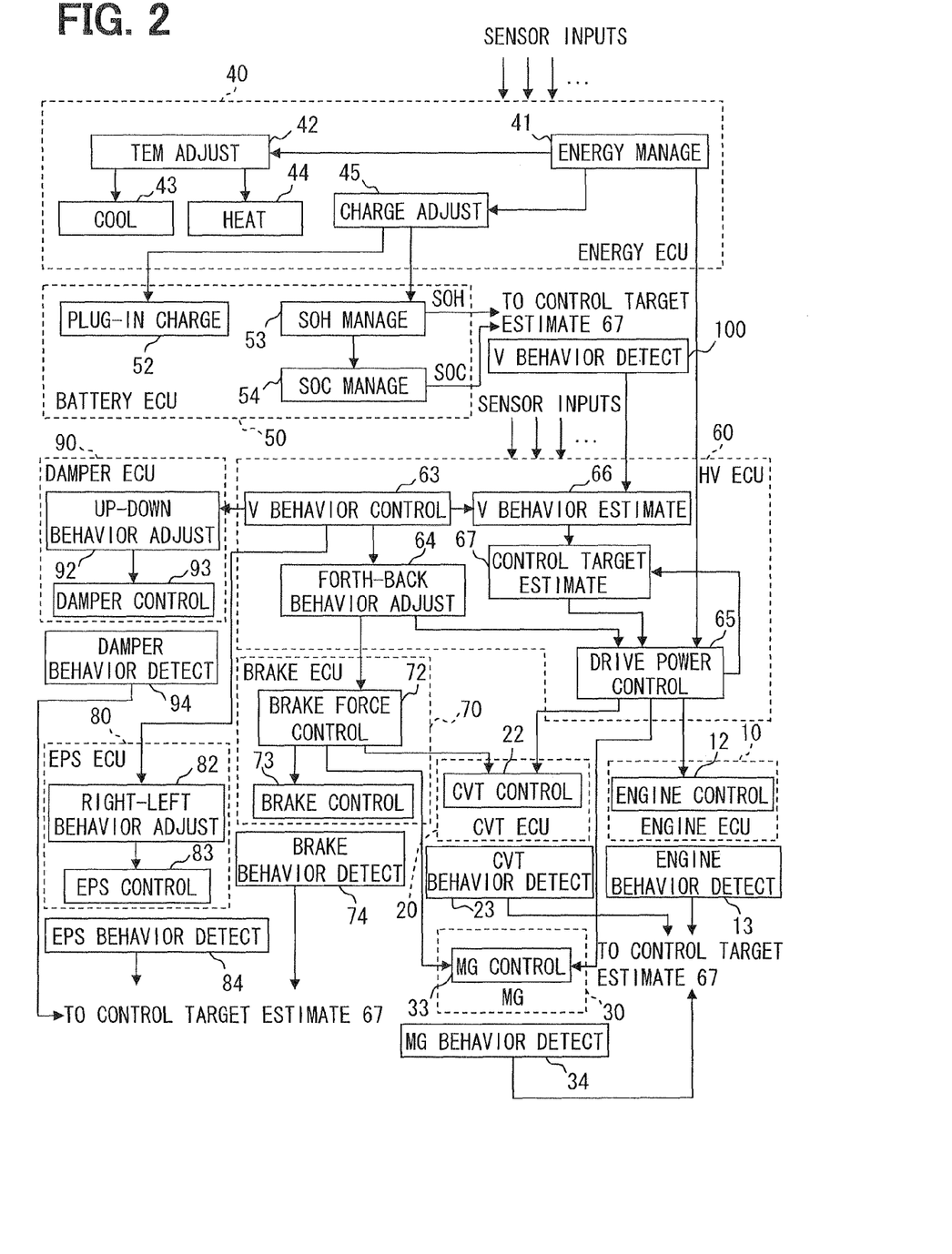
FIG. 2 is a diagram for explaining an example of a functional configuration of several ECUs that are included as a control system of a hybrid vehicle.

With reference to FIG. 2, the following explains an example of a functional configuration or arrangement of several ECUs that are included as a control system of the hybrid vehicle.

The energy management ECU 40 manages an energy consumption of the whole vehicle, and has a function to enable the vehicle to travel most efficiently. In detail, an energy management section 41 calculates an MG torque (motor generator torque) which the motor generator 32 can generate based on the capacity of the battery 51, while managing the capacity of the battery 51 based on information inputted from various kinds of sensors, etc.

With respect to the capacity management of the battery 51, the capacity of the battery 51 is changed by change of temperature; when the battery temperature rises too much, there is a possibility to cause a damage to the battery 51. Therefore, the energy management section 41 outputs a battery target temperature to a temperature adjustment section 42. The temperature adjustment section 42 executes a temperature control of the battery 51 using (i) a cooling section 43 for driving cooling equipment which cools the temperature of the battery 51 or (ii) a heating section 44 for driving heating equipment which raises the temperature of battery 51, based on the battery target temperature.

In addition, the energy management section 41 detects a charging level which is a ratio of a charge residue to a charging capacity of the battery 51, and outputs a charge and discharge instruction to the charge and discharge adjustment section 45 to prevent the overcharge or overdischarge of the battery 51. According to the charge and discharge instruction, the charge and discharge adjustment section 45 outputs a control signal to a plug-in charge section 52 or SOC (State Of Charge) management section 54 in the battery ECU 50, and adjusts the charging level of the battery 51 in a suitable range. Further, the charging capacity of the battery 51 changes according to a deterioration state (also referred to as SOH: State Of Health) of the battery 51; thus, the SOC management section 54 controls the charging level of the battery 51 using the information from the SOH management section 53.

The HV ECU 60 has primarily a function to receive information from various kinds of sensors, such as a accelerator sensor, a brake sensor, a shift position sensor, and a steering sensor, for example, and control a vehicle behavior (hereinafter, also referred to as only "behavior") of the vehicle to respond to the driver's manipulation. In specific, the vehicle behavior control section 63 outputs a target acceleration (deceleration) in the vehicle forth-and-back direction outputted to a forth-back behavior adjustment section 64, a target acceleration in the right-and-left (lateral) direction to a right-and-left behavior adjustment section 82 of the EPS ECU 80, and a target acceleration in the vehicle up-and-down direction to an up-and-down behavior adjustment section 92 of the damper ECU 90. The behavior of the vehicle is thereby controlled to respond to the driver's manipulation while stabilizing the behavior of the vehicle.

The forth and back behavior adjustment section 64 outputs a target driving torque (axle torque target value) and a target braking torque to the driving power control section 65 of the HV ECU 60, and the brake control section 72 of the brake ECU 70 so as to achieve a target acceleration in the forth-and-back direction. The driving power control section 65 has an object to realize a target driving torque most efficiently. The driving power control section 65 thus takes into consideration the maximum motor generator (MG) torque, which the motor generator 32 can generate and is acquired from the energy management section 41; the driving power control section 65 provides a target engine torque to the engine control section 12, a target MG torque to the MG control section 33, and a target transmission gear ratio to the CVT control section 22, respectively.

While the vehicle behavior estimation section 66 receives a target acceleration in the forth-and-back direction from the vehicle behavior control section 63, it compares this target acceleration with the detection acceleration by the acceleration sensor 100 (vehicle behavior detection section) which detects an acceleration actually generated in the forth-and-back direction of the vehicle. It is thereby determined whether a separation or difference arises between the target behavior and the actual behavior of the vehicle.

It is noted that an index to indicate a vehicle behavior of the vehicle may include a yaw rate which indicates a swing speed around a perpendicular axis of the vehicle, or a steering amount of the steering wheel and a distortion of a tire, in addition to the above mentioned acceleration. When using the yaw rate, or the steering amount of the steering wheel and distortion of the tire, a vehicle model may be previously prepared for calculating an index (the yaw rate, or the steering amount of the steering wheel and distortion of the tier) from the target accelerations in the forth-and-back direction and the right-and-left direction of the vehicle. Use of this vehicle model enables the calculation of a target index corresponding to a target vehicle behavior of the vehicle. In contrast, the yaw rate actually produced on the vehicle, or the steering amount of the steering wheel and distortion of the tire may be detected. The detected value may be converted into an index corresponding to the target acceleration in the forth-and-back direction or the right-and-left direction to compare.

In addition, the control target instrument estimation section 67 obtains a target instrument behavior from a control target instrument (also referred to as a behavior estimated instrument) and estimates a target instrument behavior (hereinafter also referred to as only "behavior") when operating according to the respective target control quantities. That is, the control target instrument estimation section 67 obtains a target engine torque, a target MG torque, and a target transmission gear ratio outputted from the driving power control section 65, and estimates a target instrument behavior when each of the engine 11, CVT 21, and MG 32 operates according to each control quantity serving as a target value. The model of each control target instrument may be prepared previously, for example, for the estimation of this instrument behavior. For example, in estimating the behavior of the engine 11, the engine model may be prepared so as to output the engine rotation number (also referred to as an engine speed value) generated when the engine is operated to generate the target engine torque. Then, the actual engine rotation number is detected by the rotation number sensor (engine behavior detection section) 13, thereby comparing with the estimated engine rotation number. This enables the appropriate determination as to whether the engine 11 performs the aimed or targeted operation or an anomaly occurs to cause the engine 11 to perform an anomalous operation different from the aimed one. In other words, a variation in the engine rotation number occurs when a certain anomaly occurs in the engine. This configuration enables the determination as to whether the actual behavior of the engine 11 follows the target behavior, based on the detected engine rotation number. An index to indicate the behavior of the engine may use an internal cylinder pressure or a suction air quantity of the engine.

In addition, like the engine 11, the motor generator 32 may be prepared with a motor generator model such that a motor rotation number generated when the motor generator 32 is operated is outputted so as to output a target MG torque. Thus, using the motor rotation number enables the estimation of the target behavior of the motor generator 32. Furthermore, the target behavior of the motor generator 32 may be estimated also by using the motor current. The above estimated target instrument behavior may be compared with the actual detection value of the motor rotation number or motor current detected by the motor generator behavior detection section 34 such as the rotation number sensor or the current sensor. This configuration enables the appropriate determination as to whether the motor generator 32 performs the aimed or targeted operation or an anomaly occurs to cause the motor generator 32 to perform an anomalous operation different from the aimed one. When estimating the instrument behavior according to the motor current, the motor current may be decomposed into a magnetic flux electric current and a torque electric current, each of which may be compared with the corresponding detection value.

Furthermore, the target behavior of the CVT 21 can be estimated using a transmission revolving speed ratio outputted from the CVT model. The estimated transmission revolving speed ratio is compared with the actual transmission revolving speed ratio detected by the CVT behavior detection section 23. Thereby, it can be determined whether the behavior of the CVT 21 is normal or anomalous. It is noted that the target transmission gear ratio may be used as it is as an index to indicate the target behavior of the CVT 21.

In the above, the engine 11, CVT 21, and motor generator 32 are used as examples of a control target instrument or behavior estimated instrument for the driving power control section 65. Without need to be limited thereto, another instrument such as the clutch or the battery 51 may be used as a control target instrument, and the target behavior such as an operating state or a charge status may be estimated as a target instrument behavior. It is because the behavior of the vehicle may shift or deviate from the target behavior according to the operating state of the clutch, the charge status of the battery 51.

When the clutch corresponds to a control target instrument, a quantity of slides of the clutch can be used as a parameter which indicates the behavior. In addition, when the battery 51 corresponds to a control target instrument, SOC (State of Charge) or SOH (State of Health) can be used as a parameter which indicates the behavior. If a certain anomaly arises on the battery 51, a variation appears in SOC or SOH.

In addition, in the example mentioned above, the behaviors of several control target instruments are estimated. However, there is no need to be limited thereto. Out of the several control target instruments mentioned above, the behavior of at least one control target instrument (i.e., at least one behavior estimated instrument) may be estimated.

Then, in cases that it is determined by the vehicle behavior estimation section 66 that (i) a separation arises between the target behavior and the actual behavior of the vehicle, and, at the same time, (ii) a separation arises between the estimated instrument behavior and the actual instrument behavior of the control target instrument, the control target instrument estimation section 67 performs a fail-safe action, a limp home action, and an amendment of the control quantity to the control target instrument. This enables the actual behavior of the vehicle to approach the target behavior even in the case where a certain anomaly or a transitional behavior arises in a control target instrument.

Thus, in the present embodiment, the control target instrument estimation section 67 which estimates the instrument behavior of each control target instrument is contained in the HV ECU 60 which calculates and outputs the control quantity of the ECU of each control target instrument, instead of the ECUs 10, 20, 30, . . . of controlling the individual control target instruments. This HV ECU 60 receives the sensor signals which indicate the actual behavior of each control target instrument. Therefore, the HV ECU 60 can understand whether a separation arises in between the estimated behavior and the actual behavior of each control target instrument, i.e., the behavior of each control target instrument. Therefore, the HV ECU 60 changes the control quantity to several instruments, if needed, based on the understood behavior of each control target instrument. This configuration can achieve the control of the vehicle behavior so as to enable the vehicle to stably maintain a target behavior.

The engine control section 12 adjusts a throttle valve, fuel supply, etc., to control an operational state of the engine 11 so that the engine 11 generates a target engine torque, based on the information such as an engine rotation number. The motor generator (MG) control section 33 outputs a drive signal for controlling an operating state of the motor generator 32 to the IGBT (Insulated Gate Bipolar Transistor) drive circuit (inverter circuit) 31 so that the motor generator 32 generates the target MG torque, based on the information such as the rotation number and the rotational position of the motor generator 32. The CVT control section 22 controls the transmission gear ratio of the CVT 21 to the target transmission gear ratio so that the driving torque generated by the engine 11 and the motor generator 32 is transmitted suitably to the driving wheel.

The braking force control section 72 provides a target braking torque to the brake control section 73, a target regeneration braking torque to the MG control section 33, and a target transmission gear ratio to the CVT control section 22, respectively, so as to achieve the target braking torque.

The brake control section 73 controls the brake fluid pressure and/or the drive of the electric motor so that the brake section 71 generates the target braking torque, based on the information such as each wheel speed and each brake fluid pressure of the four wheels. When the target braking torque cannot be obtained only by the target regenerative braking torque, the target braking torque is calculated to supplement the insufficiency. In such a case, the MG control section 33 controls such that the motor generator 32 operates as an electric generator (generator); the electricity generated by the motor generator 32 is charged into the battery 51.

In addition, the right-and-left behavior adjustment section 82 outputs a target assisting torque to the EPS control section 83 so as to realize the provided target acceleration in the right-and-left direction. The EPS control section 83 controls the EPS 81 such that the assisting torque generated by the EPS 81 turns into the target assisting torque, based on the information such as a driving current of the electric motor. In this case, the movement of the EPS 81 may be detected by the EPS behavior detection section 84 which detects an electric current of the electric motor and a rotation angle of the electric motor, and then outputted to the control target instrument estimation section 67 of the HV ECU 60, for example.

Furthermore, the up-and-down behavior adjustment section 92 outputs a target damping force of each damper 91 to the damper control section 93 to realize the target acceleration in the given up-and-down direction. The damper control section 93 controls the damping force of each damper 91 according to the target damping force. The movement of each damper 91 may be detected by the damper behavior detection section 94 which detects a length of the stroke and outputted to the control target instrument estimation section 67 of the HV ECU 60, for example.

The functional configuration or arrangement in each ECU mentioned above is a mere example; assignment of the functions to each ECU can be changed. In addition, it is also possible to integrate several ECUs suitably into a common or shared ECU such as one which controls both the engine 11 and the CVT 21, for example.

As mentioned above, in the hybrid vehicle equipped with the engine 11 and the motor generator 32 as a travel driving source, the hybrid vehicle ECU 60 follows the driver's acceleration requirement (accelerator pedal stepping amount) and calculates the target torques of the engine 11 and the motor generator 32, thereby outputting the calculated ones to each of the ECUs 10, 30 which control the engine 11 and the motor generator 32, respectively. Then, the ECUs 10, 30 control the engine 11 and the motor generator 32 according to the calculated target torques, respectively. Furthermore, the driving torque eventually transmitted to the vehicle is affected by the influence by the CVT 21, the clutch, the battery 51, etc.

To that end, the vehicle control apparatus according to the present embodiment is provided with the control target instrument estimation section 67. This control target instrument estimation section 67 estimates the behavior of each control target instrument so as to take suitable measures (a fail-safe action, a limp home action, and amendment of an instruction value) in consideration of the operating state of each control target instrument (subsystem) mentioned above, when the actual behavior of the vehicle shifts or deviates from the target behavior. The following will explain a vehicle control process in the vehicle control apparatus of the present embodiment using the estimated result of the behavior of each control target instrument with reference to flowcharts of FIG. 3 to FIG. 6. The process indicated in the flowchart of FIGS. 3 to 6 is mainly executed by the HV ECU 60. In addition, the following explains an example which controls such that a vehicle behavior in the forth-and-back direction approaches a target behavior.

It is further noted that a flowchart or the processing of the flowchart in the present application includes sections (also referred to as steps), which are represented, for instance, as S100. Further, each section can be divided into several subsections while several sections can be combined into a single section. Furthermore, each of thus configured sections can be referred to as a device, means, module, or processor and achieved not only as a software section in combination with a hardware device but also as a hardware section. Furthermore, the software section may be included in a software program, which may be contained in a non-transitory computer-readable storage media as a program product.

Figure 3:
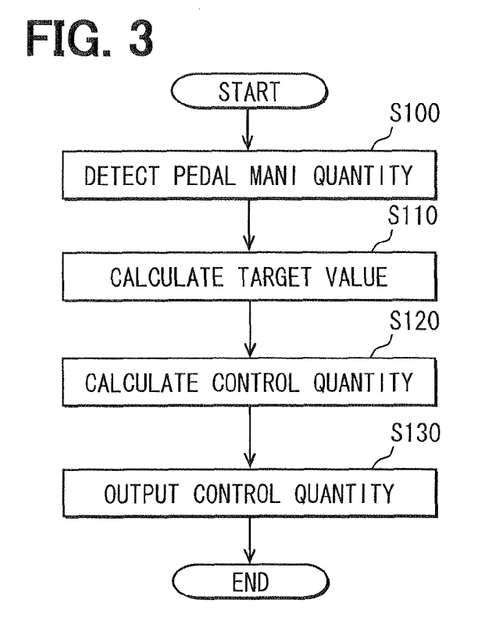
FIG. 3 is a flowchart diagram illustrating a process for calculating and outputting a control quantity of each control target instrument in a hybrid vehicle ECU.

In the flowchart of FIG. 3, first, at S100, a detection value by each sensor such as an accelerator manipulation quantity is acquired. At S110, a target acceleration (deceleration) in the forth-and-back direction and the right-and-left direction of the vehicle is calculated based on the acquired detection value by each sensor. Furthermore, a target driving torque (axle torque target value) and a target braking torque are calculated so as to achieve the calculated target acceleration in the forth-and-back direction. The calculated target driving torque is given to the driving power control section 65 of the HV ECU 60; the calculated target braking torque is given to the braking force control section 72 of the brake ECU 70.

The processing at S120 following is equivalent to the driving power control section 65. In order to realize most efficiently the axle torque target value calculated at S110, in considering the maximum motor generator torque which the motor generator 32 can generate, a target engine torque, a target motor generator torque, and a target transmission gear ratio are calculated as an operation instruction value (control quantity) of each control target instrument (i.e., each behavior estimated instrument). The target engine torque, target MG torque, and target transmission gear ratio calculated at S120 are outputted to the engine control section 12, the motor generator control section 33, and the CVT control section 22, respectively, at S130.

Figure 4:
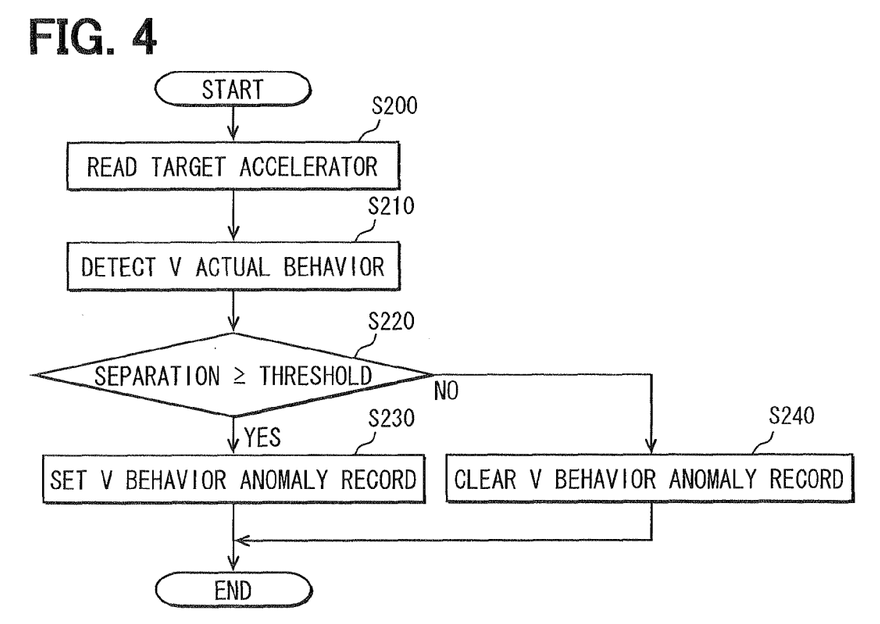
FIG. 4 is a flowchart diagram illustrating a process for determining whether a separation arises between a target behavior and an actual behavior of the vehicle.

Next, the process indicated in the flowchart of FIG. 4 is explained. The process indicated in the flowchart of FIG. 4 is mainly executed by the vehicle behavior estimation section 66 of the HV ECU 60.

First, at S200, the target acceleration in the forth-and-back direction calculated at S110 in the flowchart of FIG. 3 is read as an index which indicates the target behavior of the vehicle. At S210, the acceleration actually generated in the forth-and-back direction of the vehicle is detected using the acceleration sensor as an index which indicates the actual behavior of the vehicle.

At S220, the target acceleration and the actual acceleration are compared with each other; thus, it is determined whether the separation between them is equal to or greater than a predetermined threshold value. When it is determined that the separation is equal to or greater than the predetermined threshold value at S220, the processing proceeds to S230, where a vehicle behavior anomaly record is set. In contrast, when it is determined that the separation is less than the predetermined threshold value, the vehicle behavior anomaly record is cleared.

Figure 5:
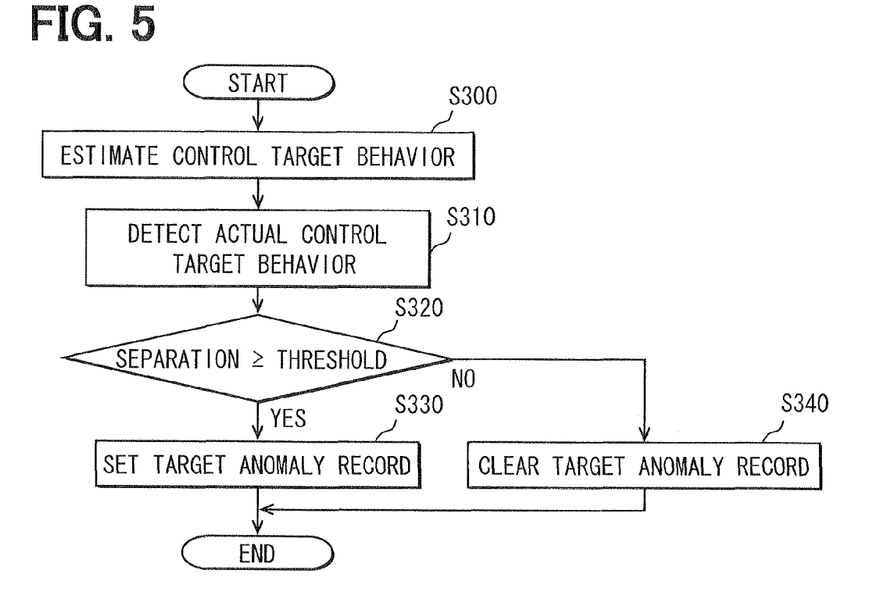
FIG. 5 is a flowchart diagram illustrating a process for determining what a magnitude of a separation arises between a target behavior and an actual behavior when each control target instrument operates according to a target operation quantity.

Next, the process indicated in the flowchart of FIG. 5 is explained. The process indicated in the flowchart of FIG. 5 is mainly executed by the control target instrument estimation section 67 of the HV ECU 60.

First, at S300, the behavior of the control target instrument is estimated based on (i) a control target instrument model such as an engine model, and (ii) the control quantity calculated at S120 of the flowchart in FIG. 3. In detail, a control quantity is inputted into the model of each control target instrument; thereby, a target behavior, which is generated when each control target instrument functions according to the control quantity serving as a target, is estimated. The index used for this behavior estimation is previously defined for every control target instrument, as mentioned above.

At S310, the index (an engine rotation number, a motor rotation number, a transmission revolving speed ratio, or the like), which indicates the actual instrument behavior of each control target instrument, is detected by a predetermined sensor. At S320, the index which indicates the target behavior of each control target instrument is compared with the index which indicates the actual behavior; thereby, it is determined whether a separation or difference between the two indices is equal to or greater than a predetermined threshold value. When it is determined that the separation is equal to or greater than the predetermined threshold value at S320, the processing proceeds to S330, where the control target instrument anomaly record is set. In contrast, when it is determined that the separation is less than the predetermined threshold value, the control target instrument anomaly record is cleared.

Figure 6:
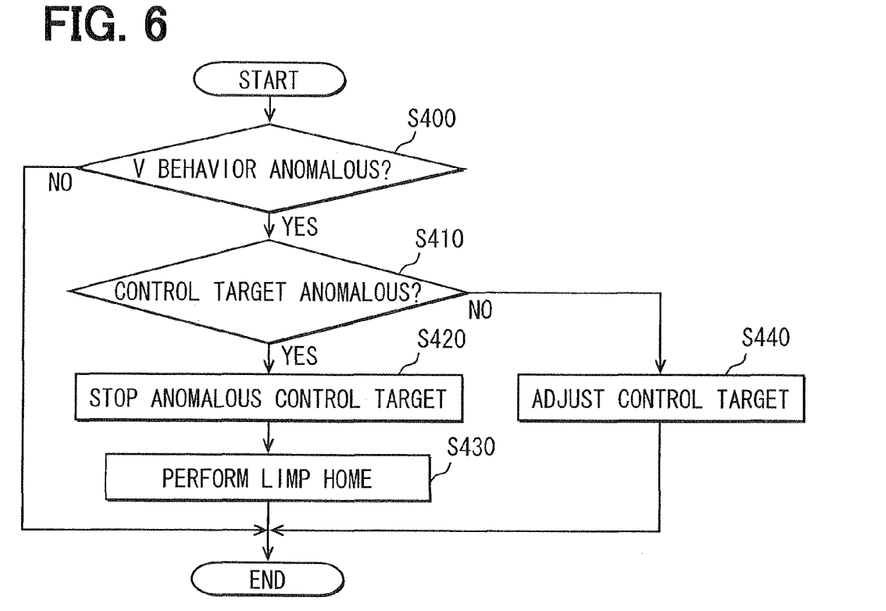
FIG. 6 is a flowchart diagram illustrating a process executed when a separation arises in the vehicle behavior and a behavior of a control target instrument.

Next, the process indicated in the flowchart of FIG. 6 is explained. The process indicated in the flowchart of FIG. 6 is mainly executed by the control target instrument estimation section 67 of the HV ECU 60.

First, at S400, it is determined whether the behavior of the vehicle is anomalous by whether the vehicle behavior anomaly record is set. When it is determines that the vehicle behavior is anomalous by this determination processing, the processing proceeds to S410. When it is determined that the vehicle behavior is normal, the process indicated in the flowchart of FIG. 6 is ended.

At S410, it is determined whether the behavior of each control target instrument is anomalous by whether the control target instrument behavior anomaly record is set. When it is determined that the control target instrument is anomalous by this determination processing, the processing proceeds to S420. When it is determined that the control target instrument is normal, the processing proceeds to S440. It is noted that the determination processing at S410 may determine that the control target instrument is anomalous when the anomalous state continues for a predetermined time duration, and may determine that the control target instrument is normal until then. This configuration can prevent the determination that the control target instrument is anomalous even when the movement becomes out of condition temporarily because of a certain cause.

At S420, the movement or operation of the control target instrument that is determined to be anomalous is stopped. For example, the movement of the motor generator 32 is stopped when an anomaly arises in the motor generator 32. In such a case, the vehicle runs only by the engine 11 as a driving source. However, if the control target instrument corresponds to one which cannot stop the movement, the movement is continued as it is (for example, the clutch, CVT, etc.). However, it is the fact that a certain anomaly arises; a certain restriction may be therefore applied to such movement. For instance, the transmission gear ratio of the CVT 21 is fixed.

At S430, since the anomaly arises in the control target instrument, the limp home action or process (degeneration operation) is executed. This limp home process outputs an instruction to the driving power control section 65 to cause another control target instrument (for example, engine 11) to take over an operation (for example, the generation of the MG torque) of the control target instrument (for example, the motor generator 32). For example, when an anomaly arises in the behavior of the motor generator 32, an instruction is outputted to the driving power control section 65 to cause the engine 11 to increase by the torque which needs to be generated by the motor generator 32. On the contrary, when an anomaly arises in the engine 11, an instruction is outputted so as to cause the motor generator 32 to increase by the torque which needs to be generated by the engine 11. Performing such a limp home process enables the behavior of the vehicle to be controlled as aimed or targeted even if an anomaly arises in a control target instrument.

Furthermore, when an anomaly arises in the clutch and the sliding quantity of the clutch increases more than a target quantity in the slide for example, the anomaly may cause a state to produce a loss occurring in the transmission of the rotation of the engine. In such a case, in the limp home process, the torque of the engine 11 is increased by the quantity corresponding to the transmission loss so as to cause the behavior of the vehicle to approach the targeted state. Similarly, when an anomaly arises in the CVT 21, the operating state of the engine 11 or motor generator 32 is changed, thereby causing the behavior of the vehicle to approach the targeted state.

In contrast, the execution of S440 signifies that although the behavior of the vehicle is anomalous, any anomaly does not arise in the control target instrument. In this case, there is presumed an occurrence of a deviation in the behavior that is not determined to be anomalous with respect to the corresponding control target instrument. Thus, the control quantity may be amended so as to adjust the operating state of the control target instrument. Thereby, the behavior of the vehicle can approach the target behavior. There may be provided a second threshold value with respect to a control target instrument so as to determine an occurrence of a separation or deviation, which is not anomalous but needs an adjustment in the control quantity, apart from the first threshold value that determines an anomaly. On condition that a separation equal to or greater than the second threshold value arises, the control quantity may be adjusted.

For example, there may be arising a transitional response delay in a certain instrument such as the engine in the hybrid vehicle. In this case, another instrument other than the certain instrument may compensate the response delay so as to maintain the vehicle behavior at the target behavior. For instance, there is a case that the number of rotation of the engine 11 does not reach the planned number of rotation slightly. In this case, the output of an engine auxiliary instrument such as an electric generator is adjusted, thereby causing the load in the engine to decrease, so as to prompt the increase in the number of rotation of the engine. In addition, the control quantity of the engine itself may be amended so as to increase the number of rotation. Thereby, the engine behavior returns to the target behavior easily; as a result, the behavior can be maintained at the target behavior of the vehicle.

The behavior control of the vehicle mentioned above may apply not only to the vehicle behavior in the forth-and-back direction but also that in the right-and-left direction or in the up-and-down direction. For example, suppose the case of applying to the behavior control of the vehicle in the right-and-left direction. There may be a case where an anomaly arises in the movement of the EPS 81 to thereby cause the actual behavior in the right-and-left direction to be determined to be deviated from the target behavior. In such a case, a target braking torque for each wheel is given by the right-and-left behavior adjustment section 82 to the brake control section 73 so as to reduce the separation. That is, a difference is provided in the braking torque in between the right wheel and the left wheel of the vehicle, thereby enabling the vehicle to revolve in the right-and-left direction. The behavior of the vehicle in the right-and-left direction can be thereby brought close to the target behavior. In addition, suppose the case of applying to the behavior control in the up-and-down direction of the vehicle. There may be a case where an anomaly arises in the movement of the damper 91 to thereby cause the actual behavior in the right-and-left direction to be determined to be deviated from the target behavior. In such a case, for example, with respect to a four-wheel driving vehicle, a difference in the driving power between the four wheels may be provided. Further, when two different driving sources are provided in the front and rear axles of the vehicle are connected, a difference in the driving power may be provided in between those two axles. Thereby, the behavior of the vehicle in the up-and-down direction can approach the target behavior.

As mentioned above, the vehicle control apparatus according to the present embodiment estimates not only the behavior of the vehicle but also the behavior of the control target instrument which controls the behavior of the vehicle. Therefore, when an anomaly arises in the behavior of the vehicle, it can be easily determined which control target instrument produces the cause. As a result, a suitable measure can be taken, for instance, by the following: the movement of the anomalous control target instrument is stopped; another control target instrument is used to take over the movement of the anomalous control target instrument; or a control quantity of a control target instrument is amended when an anomaly arises slightly.

The above mentioned embodiment of the present disclosure is thus described; however, without being restricted to the embodiment mentioned above, the present disclosure can be variously modified as long as not deviating from the scope thereof.

For example, the vehicle behavior estimation section 66 and the control target instrument estimation section 67 are installed in the HV ECU 60 in the embodiment mentioned above. There is no need to be limited thereto. The control target instrument estimation section 67 may be installed in an ECU which controls each of the several control target instruments, for example. It is noted that the cooperation or collaboration of the movement of each control target instrument is achieved by the driving power control section 65 in the HV ECU 60. That is, when both the vehicle behavior estimation section 66 and the control target instrument estimation section 67 are contained in the HV ECU 60, there is an advantage that it is easy for the HV ECU 60 to instruct each control target instrument to change its cooperative movement.

In addition, the embodiment mentioned above does not describe a cycle to estimate the behavior of each control target instrument. The estimating cycle may be identical in each of control target instruments; alternatively, it may be different in between the several control target instruments according to an operation response of each control target instrument whose movement is estimated. For example, the operation response of the motor generator 32 is quicker than the operation response of the engine 11. Therefore, suppose the case where the behavior of each of the motor generator 32 and the engine 11 is estimated as one of the several control target instruments. In this case, while the estimating cycle which estimates the behavior of the motor generator 32 is assigned with a relatively short-time cycle, the estimating cycle which estimates the behavior of the engine 11 is assigned with a relatively long-time cycle. This configuration enables the estimation of the behavior of each control target instrument to be made suitably. Further, it can suppress the increase in the arithmetic load due to the behavior estimation or the increase in the amount of the memory used for the behavior estimation.

In addition, an accuracy (also referred to as an estimating accuracy) with respect to the estimation in the behavior of a control target instrument whose behavior is estimated may be designated according to the nature of the control response of the control target instrument. The estimating accuracy may be used for estimating the behavior of the control target instrument. In detail, this estimating accuracy indicates how many bits are used as a digital index for indicating the behavior of the control target instrument. Generally, as the nature of the control response is quicker, a higher estimating accuracy is required as an accuracy at the time of estimating the behavior. Therefore, an estimating accuracy may be designated according to the control response; namely, the number of bits of the digital data for indicating an index may be designated according to the control response. Thereby, this configuration can suppress the increase in the arithmetic load due to the behavior estimation or the increase in the amount of the memory used for the behavior estimation, like in the case where an estimating cycle is designated individually.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicle control apparatus for a vehicle that is a hybrid vehicle having an engine and an electric motor as a travel driving source, the vehicle control apparatus comprising:
    an engine control unit configured to control an operation of the engine;
    a motor control unit configured to control an operation of the motor;
    a hybrid vehicle control unit configured to:
        specify target torques of the engine and the electric motor to achieve a target vehicle behavior of the hybrid vehicle by causing the engine and the electric motor to operate in cooperation, and
        cause the engine control unit and the motor control unit to operate the engine and the electric motor based on the target torques specified, and
    a vehicle behavior estimation section configured to detect an actual vehicle behavior of the hybrid vehicle and determine whether a first separation is exhibited in the hybrid vehicle between the target vehicle behavior and the actual vehicle behavior; and
    a control target instrument estimation section configured to:
        estimate an estimated behavior of each of the engine and the electric motor being operated in cooperation based on the target torques specified,
        detect an actual behavior of each of the engine and the electric motor, and
        determine whether a second separation is exhibited between the estimated behavior and the actual behavior in each of the engine and the electric motor,
    wherein
    when (i) the first separation is determined to be exhibited in the hybrid vehicle between the target vehicle behavior and the actual vehicle behavior, and, simultaneously, (ii) the second separation is determined to be exhibited in one of the engine or the electric motor between the estimated behavior and the actual behavior, the hybrid vehicle control unit is further configured to:
        calculate anew a division of necessary torque between the engine and the electric motor to permit the one of the engine or the electric motor exhibiting the second separation to be assisted by the other one of the engine or the electric motor, and
        instruct the engine control unit and the motor control unit to operate the engine and the electric motor, respectively, based on the division of necessary torque that is calculated anew.

2. The vehicle control apparatus according to claim 1, wherein:
    each of the vehicle behavior estimation section and the control target instrument estimation section is installed in the hybrid vehicle control unit.

3. The vehicle control apparatus according to claim 1, wherein:
    the control target instrument estimation section is installed in each of the engine control unit and the electric motor control unit.

4. The vehicle control apparatus according to claim 1, wherein
    when the control target instrument estimation section determines that the second separation exhibited in the one of the engine or the electric motor is equal to or greater than a predetermined threshold value so that the second separation corresponds to an anomalous state, the hybrid vehicle control unit is further configured to change an operation of an assisting instrument being the other one of the engine or the electric motor exhibiting the second separation to take over an operation of the one of the engine or the electric motor.

5. The vehicle control apparatus according to claim 4, wherein the hybrid vehicle control unit is further configured to make an adjustment to an operating state of the assisting instrument being the other one of the engine or the electric motor to reduce the second separation in cases that a magnitude of the second separation is less than the predetermined threshold value even when the second separation is determined to be exhibited in the one of the engine or the electric motor.

6. The vehicle control apparatus according to claim 4, wherein the hybrid vehicle unit is further configured to make an adjustment to a control quantity of the one of the engine or the electric motor exhibiting the second separation to reduce the second separation in cases that a magnitude of the second separation is less than the predetermined threshold value even when the second separation is determined to be exhibited.

7. The vehicle control apparatus according to claim 4, wherein the hybrid vehicle control unit is further configured to stop an operation of the one of the engine or the electric motor exhibiting the second separation when causing the assisting instrument being the other one of the engine or the electric motor to take over the operation of the one of the engine or the electric motor exhibiting the second separation.

8. The vehicle control apparatus according to claim 1, wherein the control target instrument estimation section is further configured to (i) designate an estimating cycle for estimating the instrument behavior of each of the engine and the electric motor, according to an operation response of each of the engine and the electric motor, and (ii) estimate the estimated behavior of each of the engine and the electric motor every the estimating cycle that is designated.

9. The vehicle control apparatus according to claim 1, wherein the control target instrument estimation section is further configured to (i) designate an estimating accuracy in respect of estimating the estimated behavior of each of the engine and the electric motor, according to a control response of each of the engine and the electric motor, and (ii) estimate the estimated behavior of each of the engine and the electric motor using the estimating accuracy that is designated.

10. A vehicle control apparatus for a hybrid vehicle having an engine and an electric motor as a travel driving source, the hybrid vehicle control apparatus comprising:

an engine control unit configured to control an operation of the engine;

a motor control unit configured to control an operation of the motor; and a hybrid vehicle control unit configured to:

specify target torques of the engine and the electric motor to achieve a target vehicle behavior of the hybrid vehicle by causing the engine and the electric motor to operate in cooperation, cause the engine control unit and the motor control unit to operate the engine and the electric motor based on the target torques specified, detect an actual vehicle behavior of the hybrid vehicle and determine whether a first separation is exhibited in the hybrid vehicle between the target vehicle behavior and the actual vehicle behavior, and detect an actual torque of each of the engine and the electric motor and determine whether a second separation is exhibited between the target torque and the actual torque in the engine or the electric motor, wherein when (i) the first separation is determined to be exhibited in the hybrid vehicle between the target vehicle behavior and the actual vehicle behavior, and, simultaneously, (ii) the second separation is determined to be exhibited in one of the engine or the electric motor between the target torque and the actual torque, the hybrid vehicle control unit is further configured to:

calculate anew a division of necessary torque between the engine and the electric motor to permit the one of the engine or the electric motor exhibiting the second separation to be assisted by the other one of the engine or the electric motor, and instruct the engine control unit and the motor control unit to operate the engine and the electric motor, respectively, based on the division of necessary torque that is calculated anew.

\* \* \* \* \*